April 15, 1958   J. K. POLHEMUS   2,830,776
FILM TRANSPORTING DEVICE FOR PHOTOGRAPHIC CAMERAS
Filed Aug. 9, 1955   2 Sheets-Sheet 1
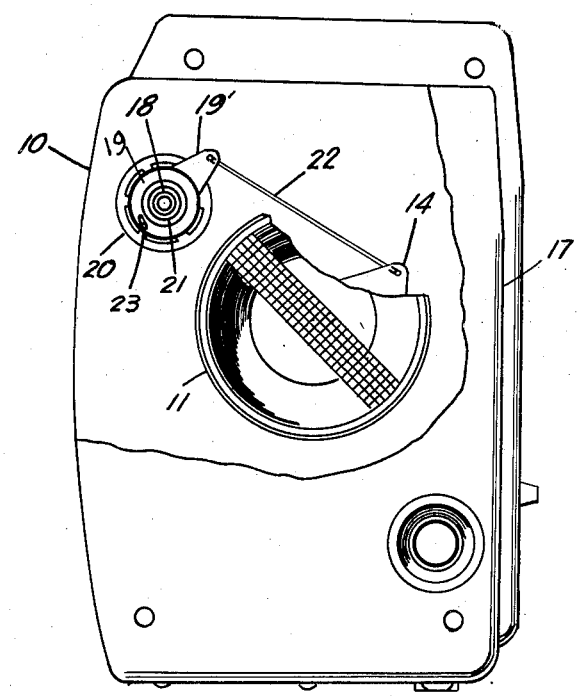
FIG I
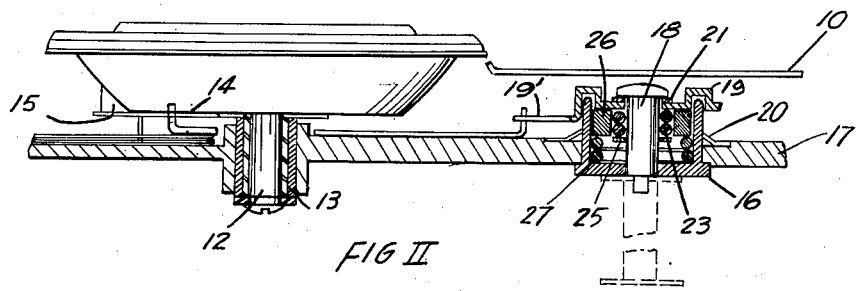
FIG II
INVENTOR
JOHN K. POLHEMUS
BY
ATTORNEY

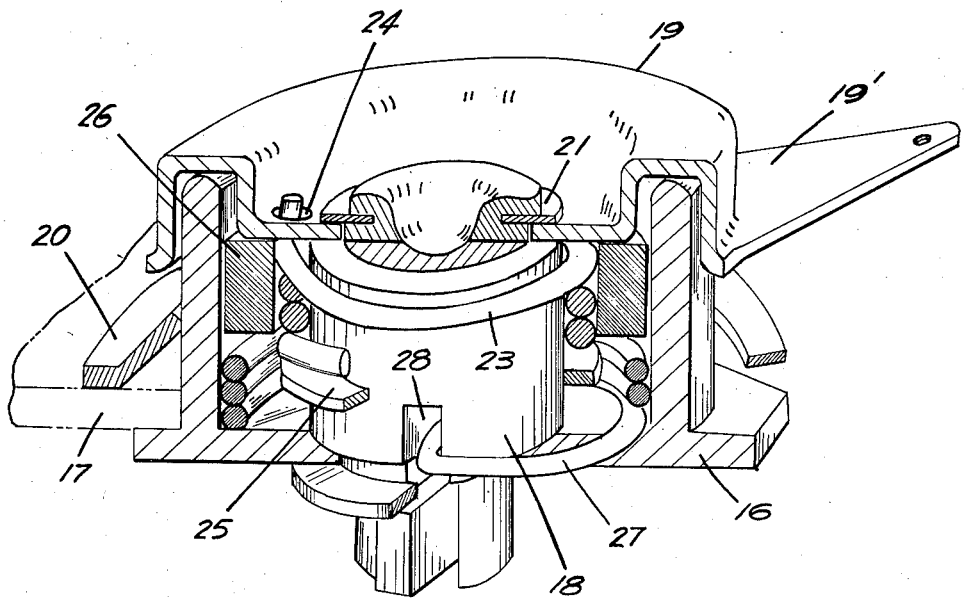
FIG III

United States Patent Office 2,830,776
Patented Apr. 15, 1958

2,830,776

FILM TRANSPORTING DEVICE FOR PHOTOGRAPHIC CAMERAS

John Kenneth Polhemus, Endwell, N. Y., assignor to General Aniline & Film Corporation, New York, N. Y., a corporation of Delaware Application August 9, 1955, Serial No. 527,312

2 Claims. (Cl. 242—71.3)

The present invention relates to a winding mechanism for transporting or winding roll film in a camera.

All cameras of the roll film type are provided with a winding device for winding the roll of film from one spool onto another to place the unexposed film in position for the next exposure. The more common type of winding device consists of a simple winding knob for rotating the windup roll positioned within the camera. Numerous camera mechanisms have been devised for winding the film with a ratchet or oscillatable movement.

A primary object of the present invention is to provide a new and novel means of transporting or winding roll film.

A further object of this invention is to provide a novel film winding mechanism which is capable of transporting the film through the camera using a reciprocating movement.

A still further object of the invention is to provide a winding mechanism of the character described which is simple in construction, relatively inexpensive to manufacture, and which is highly efficient in operation.

Other objects and features will be apparent from the following description of the invention, pointed out in particularity in the appended claims, and taken in connection with the accompanying drawings, in which:

Fig. 1 is a partial side view of a camera with certain parts broken away to show the general arrangement of the film winding device;

Fig. 2 is an enlarged sectional view of the above construction; and

Fig. 3 is an enlarged sectional view in perspective of the unidirectional clutch mechanism.

Referring to the drawings in detail, numeral 10 indicates a conventional type of camera in a closed position having a winding knob 11 located in a near central position on one side of the camera. The winding knob 11 is rotatably mounted onto the camera body by means of a fixed stud 12, and a bushing 13 surrounds the stud to serve as a bearing between the stud and the winding knob.

A radially extending plate member 14 is secured to the underside of the winding knob by means of a rivet 15. A cup bushing 16 is mounted in an opening in a side wall 17 of the camera and serves as a bearing for the film winding shaft 18. A cup-shaped cover 19 carrying a lug 19' fits over the bushing 16 so as to rotate freely. The bushing 16 is non-rotating and held in position in the wall 17 by a retaining ring 20. A washer 21 mounted on the film key shaft 18 retains the cover 19 in proper position. A connecting link 22 has its ends pivotally mounted in the lug 19' and plate member 14, respectively and transmits motion from the winding knob to the film winding shaft 18 by means of a unidirectional clutch as shown in Fig. 3 to which reference should now be made.

As can be seen from this figure, the coil spring 23 has one end anchored to the cover 19 protruding slightly through the opening 24 and is so oriented as to direction of winding that when it is driven clockwise by the cover 19, it will constrict around the key shaft 18 gripping it to revolve clockwise, whereas when the cover 19 is moved counterclockwise, the spring 23 will expand, releasing the grip from the shaft 18. A retaining ring 25 surrounding the shaft 18 holds the coil spring 23 in place. A solid ring 26 is fitted over the coil spring 23, the purpose of which is to restrain the expansion of the turns of the coil spring 23 when the cover 19 is moved counterclockwise.

The function of the ring 26 is considered important. In prior construction of such devices, the coil spring, not being restrained, expanded non-uniformly. Generally, the first turn, which is anchored to the shaft, had the maximum expansion, whereas the bottom turns did not follow this uniformly and, at times, maintained a sufficient grip on the shaft to cause reverse rotation thereof. By virtue of the ring 26, the expanding force is uniformly transmitted, all turns releasing the shaft 18 simultaneously and substantially to the same extent.

Following the description, a second coil spring 27 within the cup bushing 16 has one end anchored to the shaft 18 by being bent and held in a slot 28. In this manner the shaft 18 is held from rotating in a counterclockwise direction. The spring 27 is so wound or oriented that counterclockwise rotation will expand it, maintaining a hold on the shaft 18 by snubbing against the inner wall of the bushing 16.

It will be seen from the above, that the combined action of the two springs 23 and 24 is such that a reciprocating motion of the winding knob 11 imparts only a clockwise rotation of the shaft 18. The action is positive due to the retaining ring 26 and the simplified construction shown is well adapted to accomplish the objects and advantages of the invention.

While a preferred embodiment according to the present invention has been illustrated and described, it is understood that various modifications may be resorted to without departing from the spirit and scope of the appended claims.

This application is a continuation-in-part of my pending application, S. N. 449,239, filed August 11, 1954, now abandoned.

I claim:

1. A film winding device for roll film cameras comprising a cup bushing attached to said camera, a film winding shaft therein adapted to engage the spool upon which film is to be wound, means for rotating said shaft comprising a cup-shaped cover carrying a lug and rotatably fitting over said bushing, said shaft being secured to said cover, a coil spring having a plurality of turns surrounding said shaft and oriented to constrict around said shaft, gripping it in one direction of rotation, and to expand for releasing said shaft in the other direction of rotation, means within said bushing for restraining the expansion of said spring thereby uniformly expanding said turns, and a second coil spring surrounding said shaft and having one end attached thereto oriented to expand against said bushing for retaining said shaft in the other direction of rotation a winding knob attached to said camera at a location remote from said bushing, a radially extending plate member attached to said knob and a connecting link between said plate member and said lug for transmitting the reciprocating motion of said knob to said film winding shaft.

2. A film winding device in accordance with claim 1 wherein said means for restraining the expansion of said spring comprise a solid ring fitting loosely around said spring.

References Cited in the file of this patent

UNITED STATES PATENTS 1,591,697    Bornmann    July 6, 1926
2,575,012    Harvey    Nov. 13, 1951